(12) United States Patent  
Venkatachalam et al.

(10) Patent No.: US 8,630,245 B2
(45) Date of Patent: Jan. 14, 2014

(54) ENHANCING FRAGMENTATION AND DEFRAGMENTATION PROCEDURES IN BROADBAND WIRELESS NETWORKS

(75) Inventors: Muthaiah Venkatachalam, Beaverton, OR (US); Xiangying Yang, Portland, OR (US); Aran Bergman, Givatayim (IL); Shantidev Mohanty, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 12/889,346

(22) Filed: Sep. 23, 2010

(65) Prior Publication Data

US 2011/0110343 A1 May 12, 2011

Related U.S. Application Data

(60) Provisional application No. 61/259,086, filed on Nov. 6, 2009.

(51) Int. Cl.
*H04W 4/00* (2009.01)
(52) U.S. Cl.
USPC .......................................... 370/329; 370/338
(58) Field of Classification Search
None
See application file for complete search history.

(56) References Cited

U.S. PATENT DOCUMENTS

| | | | |
|---|---|---|---|
| 7,391,776 B2 | 6/2008 | Venkatachalam et al. | |
| 7,414,976 B2 | 8/2008 | Venkatachalam et al. | |
| 7,499,426 B2 | 3/2009 | Venkatachalam | |
| 7,548,507 B2 | 6/2009 | Pandoh et al. | |
| 7,633,904 B2 | 12/2009 | Venkatachalam | |
| 7,636,577 B2 | 12/2009 | Mohanty et al. | |
| 7,693,555 B2 | 4/2010 | Srinivasan et al. | |
| 7,720,490 B2 | 5/2010 | Venkatachalam | |
| 7,725,115 B2 | 5/2010 | Venkatachalam | |
| 7,746,896 B2 | 6/2010 | Venkatachalam | |
| 7,782,817 B2 | 8/2010 | Yang et al. | |
| 7,787,891 B2 | 8/2010 | Taaghol et al. | |
| 7,804,799 B2 | 9/2010 | Venkatachalam et al. | |
| 7,809,355 B2 | 10/2010 | Mohanty et al. | |
| 7,826,404 B2 | 11/2010 | Puthenkulam et al. | |
| 7,852,794 B2 | 12/2010 | Venkatachalam | |
| 7,860,469 B2 | 12/2010 | Mohanty et al. | |
| 7,885,210 B2 | 2/2011 | Yang et al. | |
| 7,894,449 B2 | 2/2011 | Mohanty | |
| 2005/0010676 A1 | 1/2005 | Venkatachalam et al. | |

(Continued)

OTHER PUBLICATIONS

Yang et al., "Techniques to assign multiple identifiers in a Wireless Network", U.S. Appl. No. 12/851,841, filed Aug. 6, 2010, pp. 1-29.

(Continued)

*Primary Examiner* — Suk Jin Kang
(74) *Attorney, Agent, or Firm* — Carrie A. Boone, P.C.

(57) ABSTRACT

A preemption system enables successful transmission of multiple service data units (SDUs) across a wireless interface. The preemption system addresses out-of-order transmissions of fragments of SDUs, such that the receiver is able to process each successfully. The preemption system enables a higher-priority SDU to simultaneously be transmitted with a lower-priority SDU, so that delays in processing the lower-priority SDU does not negatively affect processing of the higher-priority SDU. The preemption system also addresses non-automatic repeat request medium access controller (non-ARQ MAC) connections that only use hybrid automatic repeat request (HARQ), in which the HARQ transmission may cause out-of-order delivery of SDU fragments.

20 Claims, 8 Drawing Sheets

(56) References Cited

U.S. PATENT DOCUMENTS

| | | | |
|---|---|---|---|
| 2005/0129020 A1 | 6/2005 | Doyle et al. | |
| 2006/0221978 A1 | 10/2006 | Venkatachalam | |
| 2007/0081513 A1* | 4/2007 | Torsner | 370/349 |
| 2007/0086434 A1 | 4/2007 | Venkatachalam et al. | |
| 2007/0087767 A1 | 4/2007 | Pareek et al. | |
| 2007/0097205 A1 | 5/2007 | Venkatachalam | |
| 2007/0104132 A1 | 5/2007 | Rajagopalan et al. | |
| 2007/0105567 A1 | 5/2007 | Mohanty et al. | |
| 2007/0105600 A1 | 5/2007 | Mohanty et al. | |
| 2007/0121567 A1 | 5/2007 | Venkatachalam et al. | |
| 2007/0191031 A1 | 8/2007 | Mohanty et al. | |
| 2007/0245025 A1 | 10/2007 | Venkatachalam | |
| 2007/0259692 A1 | 11/2007 | Venkatachalam | |
| 2007/0297435 A1* | 12/2007 | Bucknell et al. | 370/412 |
| 2007/0298806 A1 | 12/2007 | Venkatachalam | |
| 2008/0014981 A1 | 1/2008 | Venkatachalam | |
| 2008/0019312 A1 | 1/2008 | Venkatachalam et al. | |
| 2008/0019394 A1 | 1/2008 | Rengarajan et al. | |
| 2008/0037460 A1 | 2/2008 | Venkatachalam | |
| 2008/0037480 A1 | 2/2008 | Venkatachalam | |
| 2008/0056219 A1 | 3/2008 | Venkatachalam | |
| 2008/0080371 A1 | 4/2008 | Liu et al. | |
| 2008/0084814 A1 | 4/2008 | Venkatachalam | |
| 2008/0084941 A1 | 4/2008 | Mohanty et al. | |
| 2008/0096614 A1 | 4/2008 | Venkatachalam | |
| 2008/0101213 A1 | 5/2008 | Mohanty et al. | |
| 2008/0101285 A1 | 5/2008 | Venkatachalam et al. | |
| 2008/0107092 A1 | 5/2008 | Taaghol et al. | |
| 2008/0108321 A1 | 5/2008 | Taaghol et al. | |
| 2008/0108336 A1 | 5/2008 | Venkatachalum et al. | |
| 2008/0151789 A1 | 6/2008 | Venkatachalam et al. | |
| 2008/0159220 A1 | 7/2008 | Kitchin et al. | |
| 2008/0165755 A1* | 7/2008 | Marinier et al. | 370/342 |
| 2008/0165805 A1* | 7/2008 | Terry et al. | 370/474 |
| 2008/0186946 A1* | 8/2008 | Marinier et al. | 370/349 |
| 2008/0198830 A1 | 8/2008 | Mohanty et al. | |
| 2008/0214213 A1 | 9/2008 | Etemad et al. | |
| 2008/0219189 A1 | 9/2008 | Kitchin et al. | |
| 2008/0219195 A1* | 9/2008 | Pani et al. | 370/310 |
| 2008/0219216 A1 | 9/2008 | Taaghol et al. | |
| 2008/0225765 A1* | 9/2008 | Marinier et al. | 370/310 |
| 2008/0225893 A1* | 9/2008 | Cave et al. | 370/476 |
| 2008/0232288 A1 | 9/2008 | Venkatachalam et al. | |
| 2008/0232401 A1 | 9/2008 | Ahmadi et al. | |
| 2008/0259835 A1 | 10/2008 | Venkatachalam et al. | |
| 2008/0279127 A1 | 11/2008 | Venkatachalam et al. | |
| 2008/0279136 A1 | 11/2008 | Taaghol et al. | |
| 2008/0310381 A1 | 12/2008 | Taaghol et al. | |
| 2008/0310386 A1 | 12/2008 | Venkatachalam | |
| 2008/0311881 A1 | 12/2008 | Taaghol et al. | |
| 2008/0311891 A1 | 12/2008 | Venkatachalam et al. | |
| 2008/0311909 A1 | 12/2008 | Taaghol et al. | |
| 2008/0311931 A1 | 12/2008 | Venkatachalam et al. | |
| 2009/0003255 A1 | 1/2009 | Mohanty et al. | |
| 2009/0003285 A1 | 1/2009 | Mohanty et al. | |
| 2009/0034526 A1 | 2/2009 | Ahmadi et al. | |
| 2009/0040970 A1 | 2/2009 | Ahmadi et al. | |
| 2009/0086659 A1* | 4/2009 | Pani et al. | 370/310 |
| 2009/0086708 A1* | 4/2009 | Pani et al. | 370/349 |
| 2009/0086709 A1* | 4/2009 | Pani et al. | 370/349 |
| 2009/0088177 A1 | 4/2009 | Yang et al. | |
| 2009/0154457 A1 | 6/2009 | Kolekar et al. | |
| 2009/0161591 A1 | 6/2009 | Ahmadi et al. | |
| 2009/0168745 A1 | 7/2009 | Ahmadi et al. | |
| 2009/0168770 A1 | 7/2009 | Mohanty | |
| 2009/0168907 A1 | 7/2009 | Mohanty et al. | |
| 2009/0257389 A1 | 10/2009 | Mohanty et al. | |
| 2009/0274105 A1 | 11/2009 | Choi et al. | |
| 2009/0323602 A1 | 12/2009 | Li et al. | |
| 2009/0323770 A1 | 12/2009 | Venkatachalam et al. | |
| 2010/0005354 A1 | 1/2010 | Zhu et al. | |
| 2010/0008325 A1 | 1/2010 | Hartman et al. | |
| 2010/0056154 A1 | 3/2010 | Venkachalam | |
| 2010/0056182 A1 | 3/2010 | Venkatachalam | |
| 2010/0103825 A1 | 4/2010 | Taaghol et al. | |
| 2010/0111047 A1 | 5/2010 | Yang et al. | |
| 2010/0128704 A1 | 5/2010 | Taaghol et al. | |
| 2010/0157906 A1 | 6/2010 | Yang et al. | |
| 2010/0166183 A1 | 7/2010 | Johnston et al. | |
| 2010/0172291 A1 | 7/2010 | Kim et al. | |
| 2010/0173631 A1 | 7/2010 | Kim et al. | |
| 2010/0202394 A1* | 8/2010 | Zhang et al. | 370/329 |
| 2010/0208831 A1 | 8/2010 | Zhu et al. | |
| 2010/0226311 A1 | 9/2010 | Yang et al. | |
| 2010/0227618 A1 | 9/2010 | Yang et al. | |
| 2010/0232356 A1* | 9/2010 | Maheshwari et al. | 370/328 |
| 2010/0275085 A1 | 10/2010 | Venkatachalam et al. | |
| 2010/0279717 A1 | 11/2010 | Venkatachalam et al. | |
| 2010/0316030 A1 | 12/2010 | Venkatachalam et al. | |
| 2010/0331000 A1 | 12/2010 | Zhu et al. | |
| 2011/0002239 A1 | 1/2011 | Venkatachalam | |
| 2011/0002297 A1 | 1/2011 | Jain et al. | |
| 2011/0002298 A1 | 1/2011 | Venkatachalam et al. | |
| 2011/0002299 A1 | 1/2011 | Venkatachalam | |
| 2011/0003591 A1 | 1/2011 | Venkatachalam et al. | |
| 2011/0004747 A1 | 1/2011 | Venkatachalam | |
| 2011/0004760 A1 | 1/2011 | Sharaga et al. | |
| 2011/0016369 A1 | 1/2011 | Bergman | |
| 2011/0044213 A1 | 2/2011 | Venkatachalam et al. | |
| 2011/0044229 A1 | 2/2011 | Etemad et al. | |
| 2011/0044266 A1 | 2/2011 | Shrivastava et al. | |
| 2011/0044307 A1 | 2/2011 | Mohanty et al. | |
| 2011/0045763 A1 | 2/2011 | Mohanty et al. | |
| 2011/0047289 A1 | 2/2011 | Venkatachalam et al. | |
| 2011/0188464 A1* | 8/2011 | Shinohara et al. | 370/329 |
| 2011/0205945 A1* | 8/2011 | Cave et al. | 370/310 |
| 2012/0057530 A1* | 3/2012 | Marinier et al. | 370/328 |
| 2012/0089721 A1* | 4/2012 | Day | 709/223 |
| 2012/0176971 A1* | 7/2012 | Pani et al. | 370/328 |

OTHER PUBLICATIONS

Yang, et al., "Coordinating broadcast operations in a mobile wireless network with Overlaid cells", U.S. Appl. No. 12/633,853, filed Dec. 9, 2009, pp. 1-27.

Venkatachalam, et al., "Uplink Contention Based Access With Quick Access Channel", U.S. Appl. No. 12/890,819, filed Sep. 27, 2010, pp. 1-22.

Zhu, et al., "Configurable Common Rerfernce Signal Port for Reference Signal Received Power in Distributed Antenna Systems", U.S. Appl. No. 12/928,758, filed Dec. 17, 2010, pp, 1-16.

Yang, et al., "Techniques to Assign Identifiers in a Wireless Network", U.S. Appl. No. 12/851,756, filed Aug. 6, 2010, pp. 1-19.

Venkatachalam, et al., "Cell Reselection Mechanism for a Base Station with Closed Subscriber Group",U.S. Appl. No. 12/886,764, filed Sep. 21, 2010, pp. 1-27.

Venkatachalam, "Mechanisms to Update a Serving Base Station With the CSG Memberships of a Mobile Station", U.S. Appl. No. 12/911,394, filed Oct. 25, 2010, pp. 1-20.

Venkatachalam, et al., "Techniques for Timing Optimization in Wireless Networks That Utilize a Universal Services Interface", U.S. Appl. No. 13/006,605, filed Jan. 14, 2011.

Venkatachalam, "Managing Interference Due to Low Power BSs", U.S. Appl. No. 12/889,025, filed Sep. 23, 2010, pp. 1-25.

Venkatachalam, "Femtocell Architecture and Network", U.S. Appl. No. 12/645,045, filed Dec. 22, 2009, pp. 1-18.

Venkatachalam, "Airlink Techniques Enabling Dynamic Optimization and Configuration of Wireless Network Base Stations", U.S. Appl. No. 12/906,488, filed Oct. 18, 2010, pp. 1-18.

Venkatachalam, et al., "Management of Ids for Closed Subscriber Group (CSG) Base Stations", U.S. Appl. No. 12/882,924, filed Sep. 15, 2010.

Shan, et al., "Wimax Voip Service Architecture", U.S. Appl. No. 12/940,288, filed Nov. 5, 2010, pp. 1-40.

Srinivasan, et al., "Sleep-mode wireless cell reselection Apparatus, systems, and methods", U.S. Appl. No. 12/650,157, filed Dec. 30, 2009, pp. 1-24.

Bergman, "Techniques Utilizing ARQ Feedback for Efficient Transmitter Buffer Usage", U.S. Appl. No. 12/890,020, filed Sep. 24, 2010, pp. 1-26.

(56) References Cited

OTHER PUBLICATIONS

Yang, et al., "Improved Radio-Link Reliability Using Multi-Carrier Capability in Wireless Broadband Systems", U.S. Appl. No. 12/822,643, filed Jun. 24, 2010, pp. 1-29.

Mohanty, et al, "Sleep Optimization for Mobile Devices in a Weless Nework", U.S. Appl. No. 12/955,060, filed Nov. 29, 2010, pp. 1-40.

Venkatachalam et al., "Legacy and Advanced Access Service Network Internetworking", U.S. Appl. No. 12/889,285, filed Sep. 23, 2010, pp. 1-25.

Yang, et al., "Security Update Procedure for Zone Switching in Mixed-Mode Wimax Network", U.S. Appl. No. 12/855,400, filed Aug. 12, 2010, pp. 1-35.

Ahmadi, et al., "Transmission of System Configuration Information in Mobile Networks", U.S. Appl. No. 12/638,846, filed Dec. 15, 2009, pp. 1-37.

Venkatachalam, et al., "Apparatus and Methods for Upgrading an Airlink in a Wireless System", U.S. Appl. No. 12/890,179, filed Sep. 24, 2010, pp. 1-25.

Venkatachalam, et al., "Coverage Loss Recovery in a Wireless Communication Network", U.S. Appl. No. 12/826,639, filed Jun. 29, 2010, pp. 1-38.

Venkatachalam, et al., "Wireless Device and Method for Efficiently Paging Idle-mode Mobile Stations in Multicarrier Systems", U.S. Appl. No. 12/862,120, filed Aug. 24, 2010, pp. 1-19.

Yang, et al., "Relay Data Path Architecture for a Wireless Network", U.S. Appl. No. 12/872,808, filed Aug. 31, 2010, pp. 1-27.

Zhu, et al., "Physical Uplink Control Channel Interference Mitigation in Heterogenous Networks", U.S. Appl. No. 12/930,001, filed Dec. 23, 2010, pp. 1-32.

Venkatachalam, et al., "Distributed Control Architecture for Relays in Broadband Wireless Networks", U.S. Appl. No. 12/889,938, filed Sep. 24, 2010, pp. 1-33.

Jain, et al., "Single Radio Wimax Interworking", U.S. Appl. No. 12/862,512, filed Aug. 24, 2010, pp. 1-37.

Yang, et al., "Uplink Power Headroom Calculation and Reporting for OFDMA Carrier Aggregation Communication System", U.S. Appl. No. 12/889,318, filed Sep. 23, 2010, pp. 1-20.

Zhu, et al., "Techniques for formatting signals for transmission using a wireless network", U.S. Appl. No. 12/962,045, filed Dec. 7, 2010, pp. 1-30.

Yang, et al., "Base Station Selection Method for Heterogeneous Overlay Networks", U.S. Appl. No. 12/977,797, filed Dec. 23, 2010, pp. 1-30.

Sharaga, et al., "Neighbor List Broadcasting Techniques", U.S. Appl. No. 12/914,097, filed Oct. 28, 2010, pp. 1-29.

\* cited by examiner

ENHANCING FRAGMENTATION AND DEFRAGMENTATION PROCEDURES IN BROADBAND WIRELESS NETWORKS

CROSS-REFERENCE TO RELATED APPLICATIONS

This application claims priority under 35 U.S.C. 119(e) to U.S. Provisional Patent Application No. 61/259,086, filed on Nov. 6, 2009.

TECHNICAL FIELD

This application relates to the 802.16m standard and the fragmentation and defragmentation of packets under the 802.16m standard.

BACKGROUND

WiMAX, short for worldwide interoperability for microwave access, is currently defined by the Institute of Electrical and Electronics Engineers, or IEEE, 802.16-series specification. The advanced air interface standard is defined under 802.16m.

Packets known as service data units (SDUs) travel wirelessly between a transmitter and a receiver, such as between a base station and a mobile station, using the advanced air interface standard. Sometimes, these SDUs are fragmented into two, three, or hundreds of fragments before transmission. A fragmentation state machine at the transmitter and a defragmentation state machine at the receiver process these fragmented SDUs.

Currently under 802.16m, if a first SDU, SDU1, is being fragmented, a second, higher-priority SDU, SDU2, would have to wait in queue until all the fragments of SDU1 have been transmitted before SDU2 may be fragmented and transmitted. Particularly where large, low-priority SDUs are transmitted, this leads to undesirable results. For example, a power control request, which involves only a few bytes, is unprocessed while waiting for a very large management message, such as is used with PKM (about two Kbytes) to be processed. The power control message may be delayed indefinitely while the large PKM message is being fragmented and transmitted.

Also, as currently defined under the 802.16m standard, SDUs are dropped under certain operating conditions, namely, for non-automatic repeat request (non-ARQ) media access controller (MAC) connections that only use hybrid automatic repeat request (HARQ). "Upon loss, the receiver shall discard all SDU fragments on the connection until a new first SDU fragment is detected . . . ". HARQ operations may temporarily miss a burst that contains some fragment of a SDU because HARQ does not guarantee in-order delivery. If the 802.16m standard does not define a mechanism to restore the order of the protocol data units (PDUs)/bursts before such a defragmentation mechanism, it will drop SDUs even though all of its fragments are correctly received (just not in order). This is especially crucial for MAC management connections where ARQ is not used and only HARQ is used.

Thus, there is a continuing need for a method to overcome the shortcomings of the prior art.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In accordance with the embodiments described herein, a preemption system is disclosed for successfully transmitting multiple SDUs across a wireless interface. The preemption system addresses out-of-order transmissions of fragments of SDUs, such that the receiver is able to process each SDU successfully. The preemption system enables a higher-priority SDU to simultaneously be transmitted with a lower-priority SDU, so that delays in processing the lower-priority SDU does not negatively affect processing of the higher-priority SDU. The preemption system also addresses non-ARQ MAC connections that only use HARQ, in which the HARQ transmission may cause out-of-order delivery of SDU fragments.

In the following detailed description, reference is made to the accompanying drawings, which show by way of illustration specific embodiments in which the subject matter described herein may be practiced. However, it is to be understood that other embodiments will become apparent to those of ordinary skill in the art upon reading this disclosure. The following detailed description is, therefore, not to be construed in a limiting sense, as the scope of the subject matter is defined by the claims.

Figure 1:
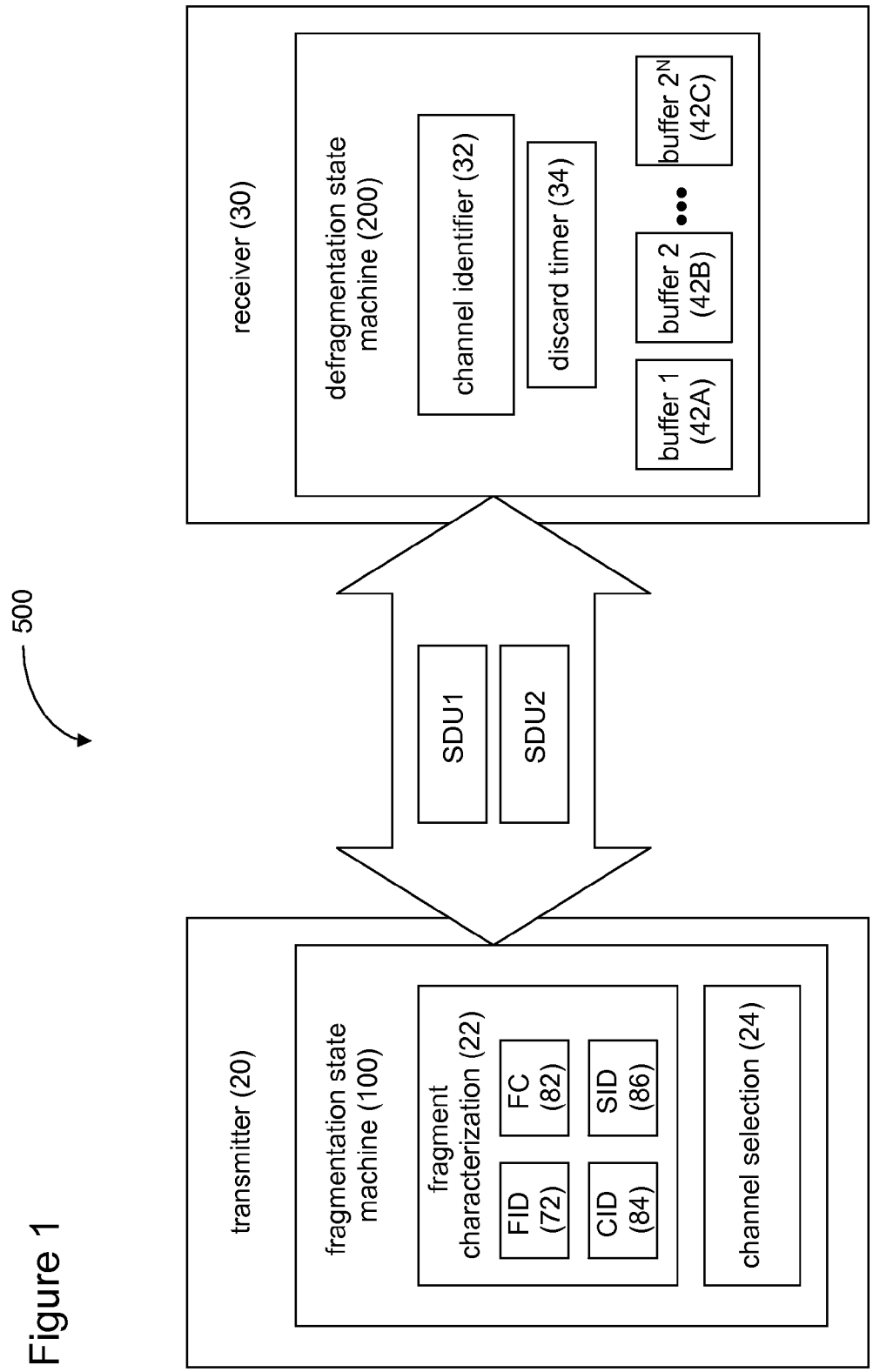
FIG. 1 is a block diagram of a preemption system for processing out-of-order fragments of two different service data units, according to some embodiments.

FIG. 1 is a block diagram of a preemption system 500, according to some embodiments. The preemption system 500 consists of a transmitter 20 and a receiver 30, in which the transmitter and receiver are part of a WiMAX network. The preemption system 500 may found in a base station and in a subscriber station, such as a cellular phone, in which the base station and the subscriber station transmit wirelessly between one another. In FIG. 1, the transmitter 20 and receiver 30 are transmitting two service data units, SDU1 and SDU2, between one another. Although just two SDUs are shown in FIG. 1, the principles described herein may be applied to any number of concurrent SDUs being sent.

The transmitter 20 of the preemption system 500 includes a fragmentation state machine 100 for preparing the SDUs for wireless transmission. The fragmentation state machine 100 includes fragment characterization 22, which utilizes header fields 72, 82, 84, and 86 to communicate information about each SDU fragment to the receiver 30, such that the receiver does not discard fragments due to out-of-order transmission of SDU fragments. The header fields are described in more detail in FIGS. 3 and 4, below. The fragmentation state machine 100 further includes a channel select mechanism 24, which assigns different channels to different SDUs, where necessary, to ensure efficient transmission of both. The fragmentation state machine 100 is described in more detail in FIG. 6, below.

The receiver 30 of the preemption system 500 includes a defragmentation state machine 200, for processing the wirelessly received SDU fragments. The defragmentation state machine 200 includes a channel identifier 32, a discard timer 34, and up to N buffers 42A, 42B, . . . , 42C (collectively, buffers 42), where N is an integer. The channel identifier 32 uses the header fields, populated by the transmitter 20 with information about each SDU, as indexes into different buffers, as needed, enabling the receiver 30 to process the out-of-order SDU fragments. The defragmentation state machine 200 is described in more detail in FIG. 7, below.

Under the 802.16m standard, there are scenarios in which SDUs are either not processed at all (failure) or are processed in an undesirably slow manner (inefficient). The preemption system 500 enables these SDUs to be successfully and efficiently decoded at the receiver 30 following transmission over the WiMAX network. Under the current 802.16m standard, there exist multiple scenarios in which such processing failure or inefficiency may arise. For example, if a first SDU, SDU1, is fragmented before being transmitted, then a higher priority SDU, SDU2, waits in a queue until all the fragments of SDU1 have been transmitted before SDU2 can be fragmented and transmitted. Where SDU1 is very large, this can cause a significant delay in transmitting SDU2. Where SDU2 is a high-priority SDU, such as a power control request, the delay may be undesirable.

Figure 2:
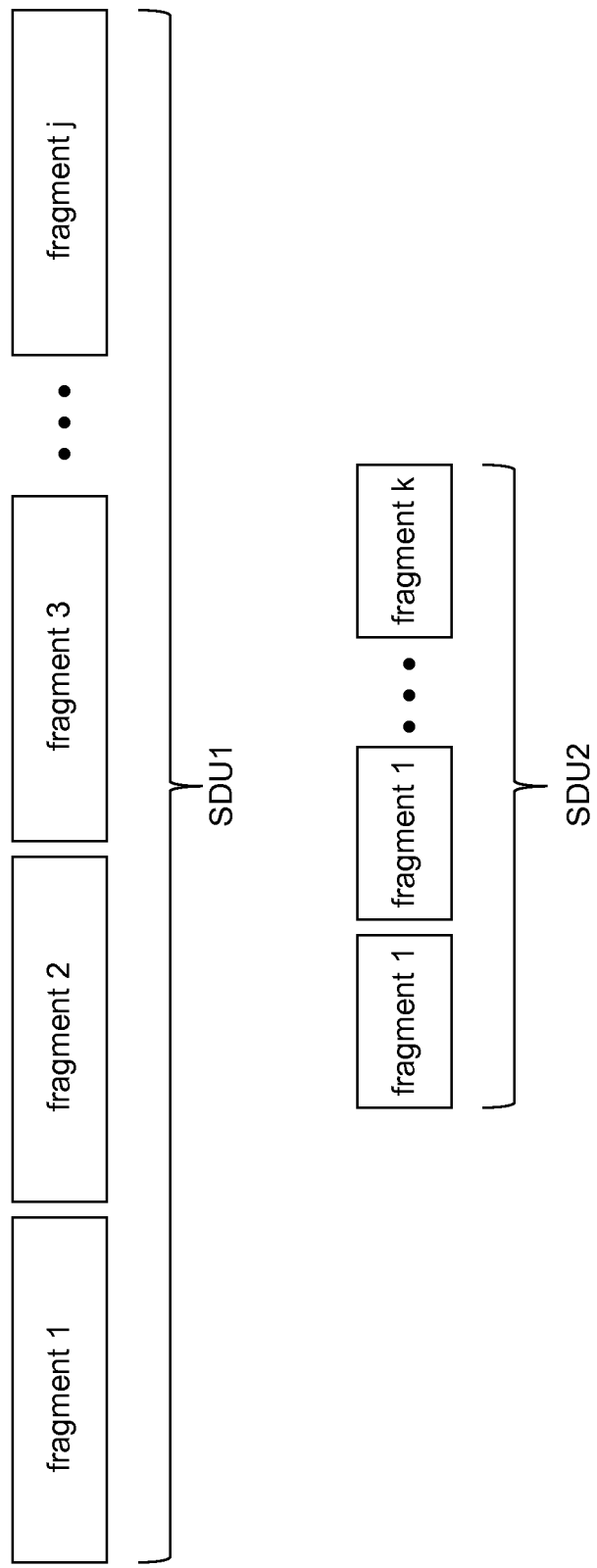
FIG. 2 is a block diagram of a first service data unit having j fragments and a second service data unit having k fragments, both of which are processed by the preemption system of FIG. 1, according to some embodiments.

FIG. 2 is a block diagram of two service data units, SDU1 and SDU2, each having multiple fragments, according to some embodiments. In FIG. 2, the SDU1 has j fragments and the SDU2 has k fragments, where j and k are integers. The size of SDU1 is larger than SDU2, but it is not necessary that SDU1 be larger than SDU2. As used herein, however, SDU2 is presumed to have a higher priority than SDU1.

In some embodiments, the fragmentation state machine 100 of the transmitter 20 includes a mechanism to preempt the transmission of the fragments of SDU1 with the fragments of the higher priority SDU2 on the same MAC layer connection. The fragment characterization 22 utilizes an already defined field of one header and defines three new fields in a second header, where both headers are used under WiMAX for wirelessly transmitting the SDUs.

Figure 3:
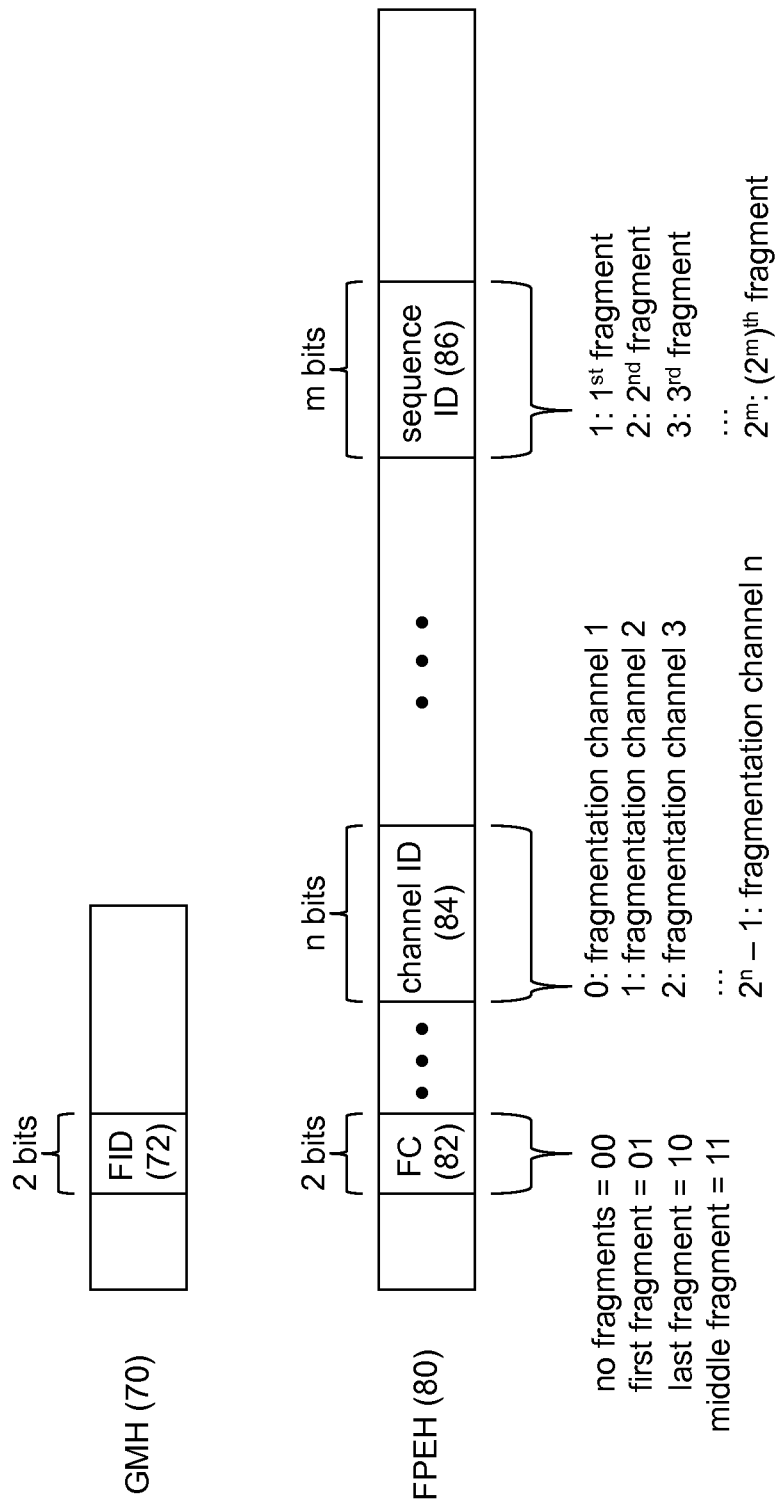
FIG. 3 is a block diagram of data connection headers with newly defined fields used by the preemption system of FIG. 1, according to some embodiments.
Figure 4:
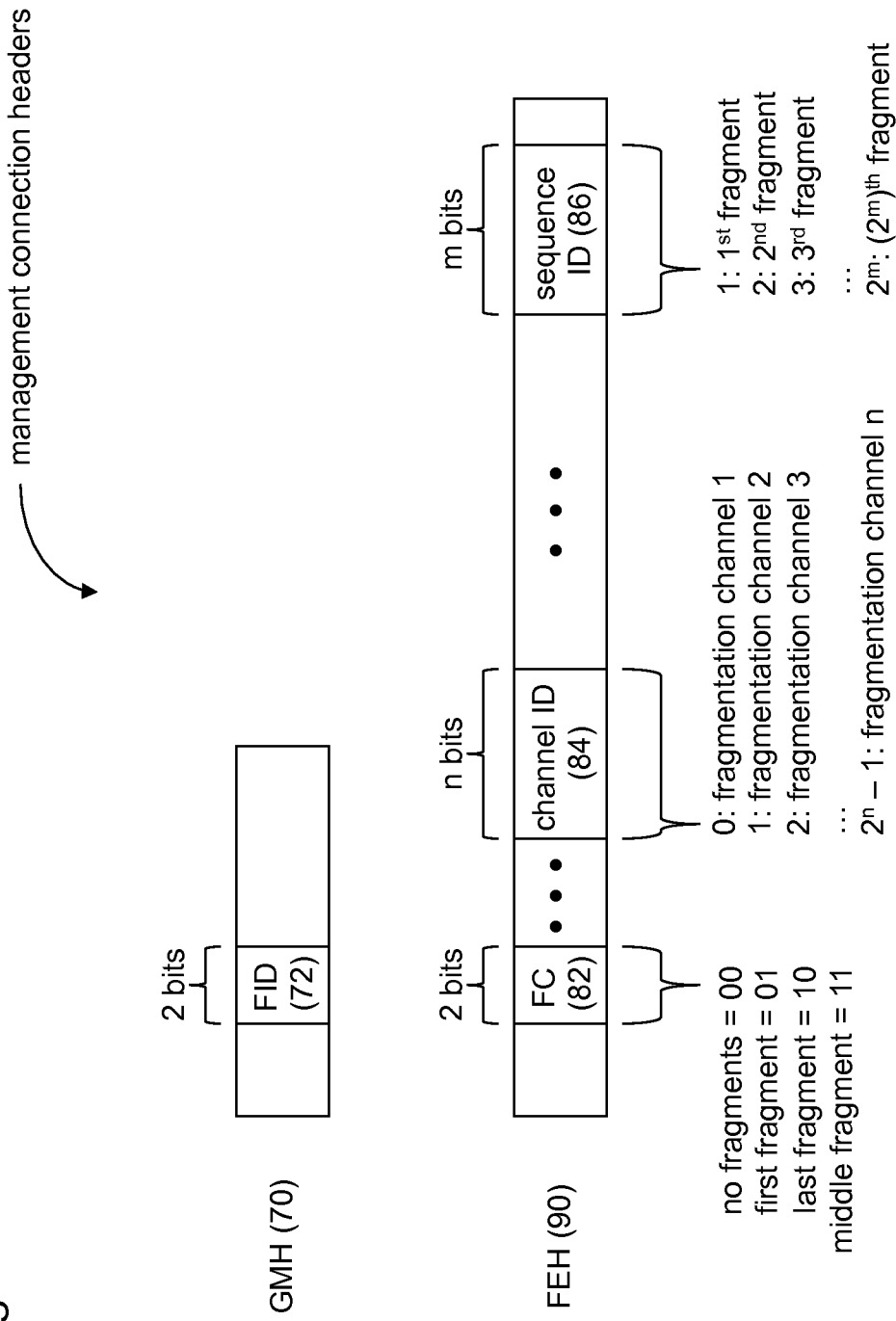
FIG. 4 is a block diagram of management connection headers with newly defined fields used by the preemption system of FIG. 1, according to some embodiments.

FIGS. 3 and 4 are block diagrams showing data connection headers and management connection headers, respectively, according to some embodiments. Each fragment of each data SDU is preceded by the headers in FIG. 3. The data connection headers include a general MAC header (GMH) 70 and a fragmentation and packing extension header (FPEH) 80. The GMH 70 includes a flow ID (FID) field 72. The FID 72 indicates the MAC channel upon which the SDU is to be transmitted. As used herein, reference to "the MAC channel" is defined as a channel with a MAC/flow connection. The FID 72 is not a newly defined field, but is used by the fragment characterization 22 of the fragmentation engine 200 to indicate the channel in which the SDU is to be transmitted. Likewise, the defragmentation state machine 200 receiving the SDU can identify its transmission channel by reading the FID field 72.

In some embodiments, the FPEH 80 includes three newly defined fields, a fixed-sized (two-bit) fragmentation control (FC) field 82, a variable-sized (n-bit) channel identifier (channel ID, or CID) field 84, and an m-bit sequence identifier (sequence ID, or SID) 86. The CID field 84 indicates which of $2^n$ channels is used to transmit the SDU. For n=1, there are two available channels, for n=2, there are four available channels, and so on.

The other two fields, the FC field 82 and the SID field 86 are used by the fragment characterization engine 22 to explicitly characterize each fragment of each SDU. The FC field 82 identifies whether the SDU is fragmented or not. If the SDU is fragmented, the FC field 82 indicates whether this fragment is the first fragment (01), the last fragment (10), or a middle fragment (11) of the fragmented SDU. The SID field 86 then specifies the first, middle, and last fragments. In a preferred embodiment, the SID is added also for an unfragmented SDU, where the SID is incremented for any fragment and for any unfragmented SDU that is sent on the specific channel. An SDU may be fragmented into three fragments while a second SDU may include 512 fragments. In the latter case, the SID field 86 helps the receiver to identify each SDU fragment, even if they are received out of sequence.

The SID field 86 is also helpful when fragments are received out of order when two SDUs are sent on the same channel (one after the other) and each is fragmented into three parts. For example, $SDU2_{f1}$ (second SDU, first fragment) could be received before any fragment of SDU1. $SDU1_{f2}$ could be received next, followed by the remaining segments. To make sense of this, the defragmentation machine needs the SID to be incremented for each fragment that is sent, including the first and last fragments. Then, a distinction between $SDU1_{f1}$ and $SDU2_{f2}$ can be made, and it would be clear that $SDU1_{f2}$ does not come after $SDU1_{f1}$.

Similarly, FIG. 4 shows the management connection headers used by the preemption system 500 of FIG. 1. The newly defined fields in the fragmentation extension header (FEH) 90 are identical to the field found in the FPEH 80 (FIG. 3). Using these newly defined fields, the preemption system 500 thus provides a mechanism for the fragmentation state machine 100 at the transmitter 20 and the defragmentation machine 200 at the receiver 30 to fully identify the fragments of multiple SDUs so that fragments are neither lost nor unnecessarily retransmitted.

Figure 5:
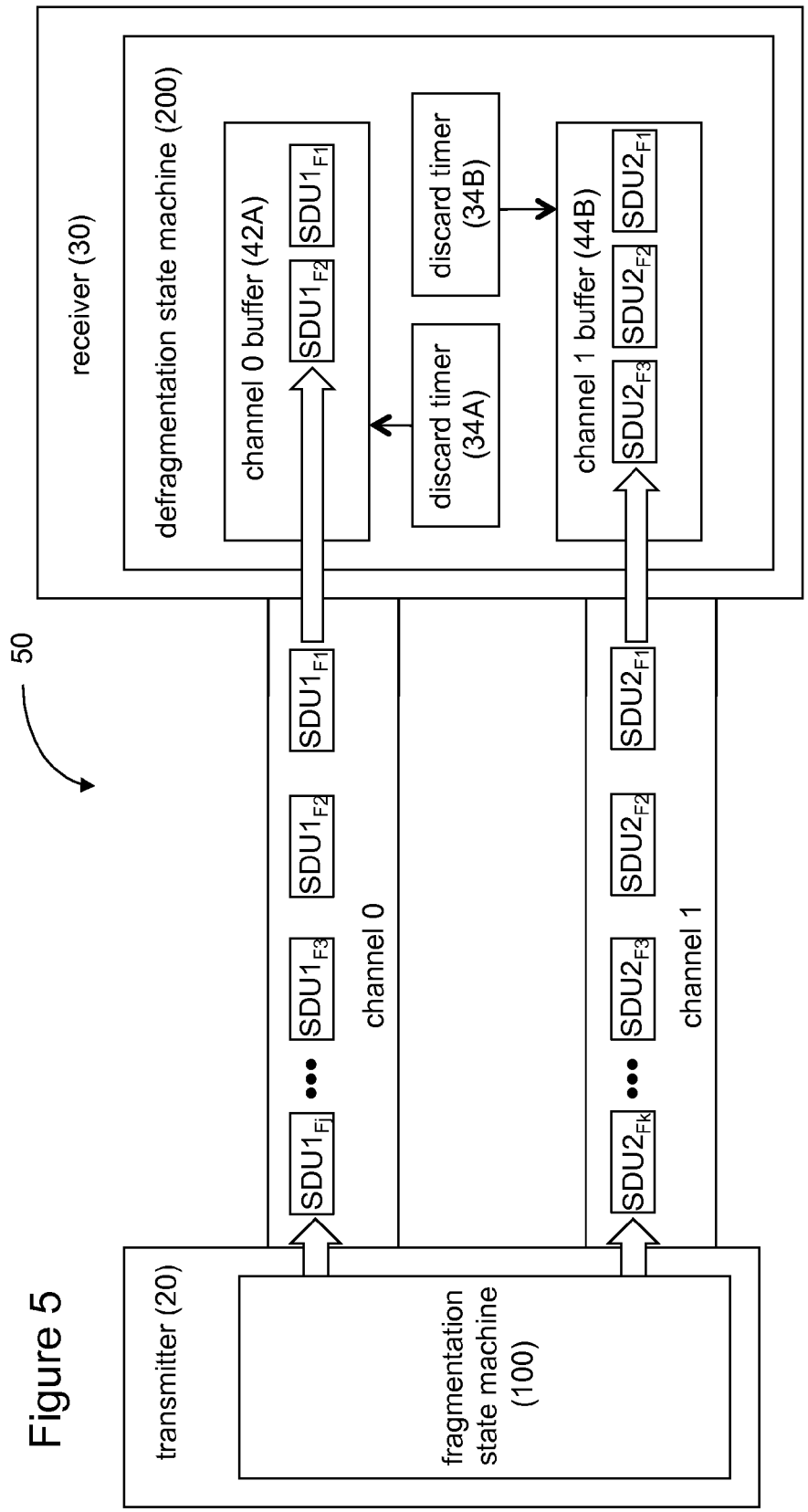
FIG. 5 is a schematic block diagram showing operations of the preemption system of FIG. 1 to simultaneously transmit fragments for two different service data units over two different channels using the fields of FIG. 3 or 4, according to some embodiments.
Figure 6:
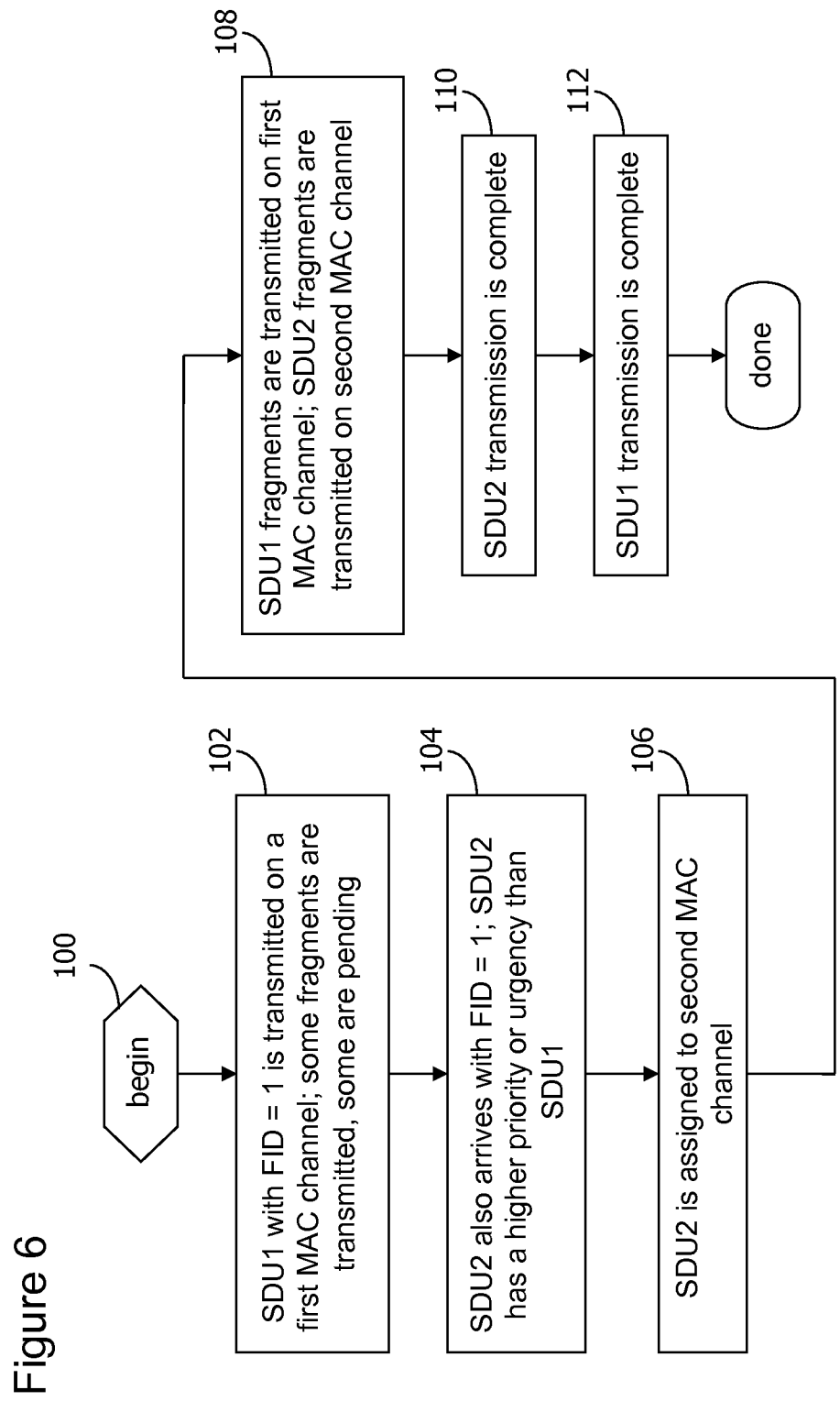
FIG. 6 is a flow diagram showing operations of the fragmentation state machine of the preemption system of FIG. 1, according to some embodiments.
Figure 7:
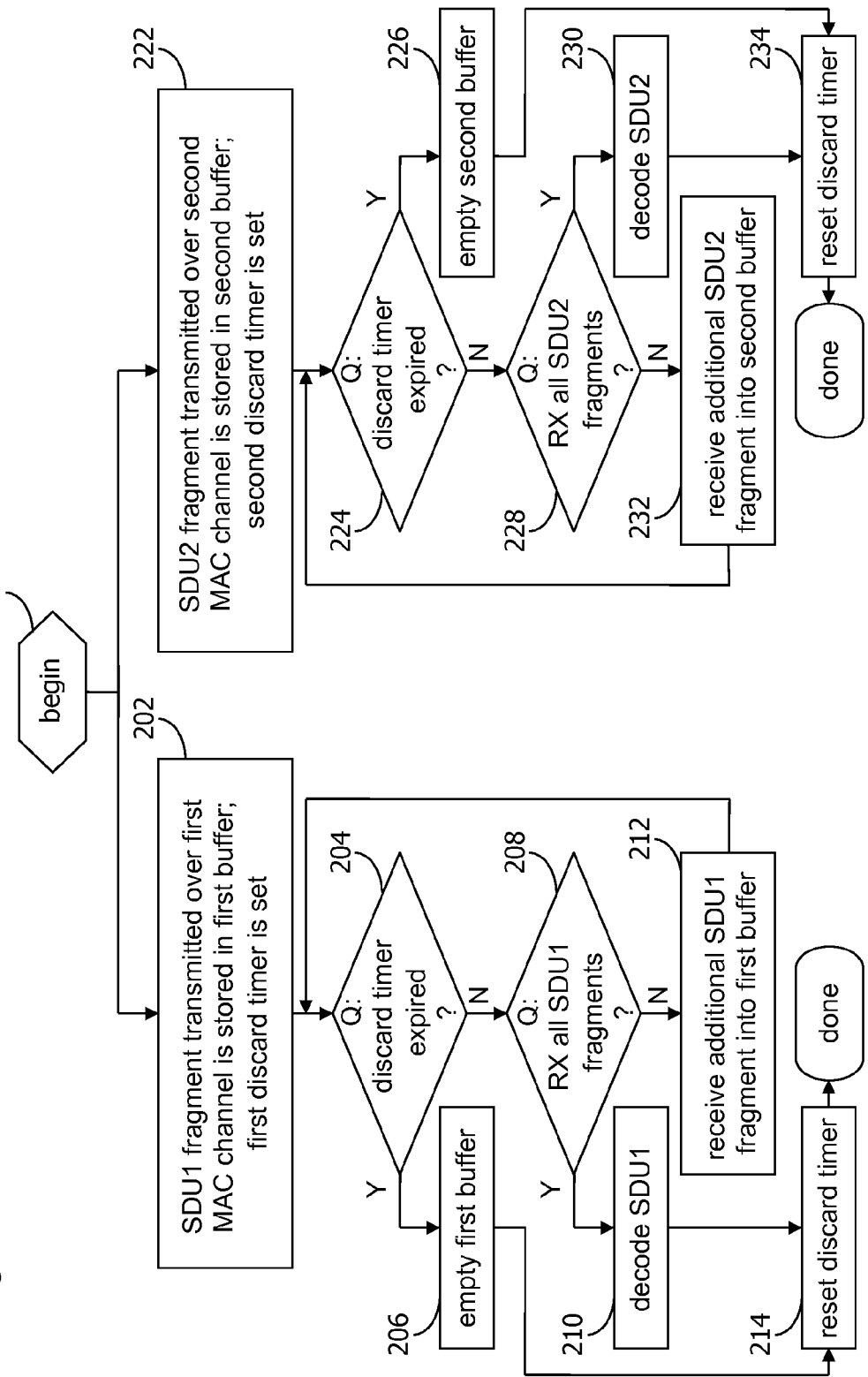
FIG. 7 is a flow diagram showing operations of the defragmentation state machine of the preemption system of FIG. 1, according to some embodiments.

FIGS. 6 and 7 provide the details, from the perspective of the transmitter 20 and the receiver 30, respectively, for how the preemption system 500 operates. Before describing these details, FIG. 5 provides a simplified schematic diagram showing the preemption operations for two SDUs being wirelessly transmitted under WiMAX. The transmitter 20 is expected to transmit two SDUs, SDU1 and SDU2, each of which is split into an integer number of different fragments. SDU1 is divided into j fragments before transmission; SDU2 is divided into k fragments before transmission.

Each SDU fragment is coupled with the headers illustrated in FIGS. 3 and 4: the GMH 70 and FPEH 80 headers precede fragments for data SDUs and the GMH 70 and FEH 90 headers precede fragments for management SDUs. These headers 70, 80, 90 provide the information needed by the defragmentation state machine 200 to efficiently process all incoming fragments.

At the transmitter 20, the fragmentation state machine 100 begins to transmit the first SDU, SDU1, which is divided into fragments, denoted $SDU_{F1}$, $SDU_{F3}$, ..., $SDU_{Fj}$. These fragments are transmitted wirelessly to the receiver 30 using a first channel, denoted channel 0. Before transmission of all SDU1 fragments is complete, the transmitter receives a request to send a second SDU, SDU2. It turns out that SDU2 has a higher priority than SDU1. As an example, SDU2 may be a power control request having only a few fragments while SDU1 may have hundreds of fragments. In prior art WiMAX implementations, the power control request is processed only after SDU1 is completely transmitted. Alternatively, the channel select mechanism 24 of the fragmentation state machine 100 establishes a second channel, channel 1, for transmitting SDU2. This enables SDU2 and SDU1 to be processed simultaneously.

On the receiver side, the defragmentation state machine 200 includes $2^N$ separate buffers 42 for storing SDU fragments from different channels. In the configuration of FIG. 5, N=1, thus, there are two buffers 42A and 42B, the first for channel 0 transmissions, the second for channel 1 transmissions. All fragments of each SDU are stored in a separate buffer. Further, because each fragment of each SDU is explicitly identified, the defragmentation state machine 200 can manage out-of-order transmissions of SDU fragments without having to discard them and request a resend.

Returning to FIG. 1, the defragmentation state machine 200 also includes the discard timer 34 for keeping track of the incoming SDU fragments. In some embodiments, there is a separate discard timer 34 for each buffer 42 of a non-ARQ MAC connection. Thus, in FIG. 5, there is a discard timer 34A for buffer 42A and a discard timer 34B for buffer 42B. There may also be a discard timer for each SDU in each buffer.

In some embodiments, the defragmentation state machine 200 is enhanced for non-ARQ MAC connections that only use HARQ. As described above, these types of connections can lead to out-of-order transmissions that, under the current 802.16m standard, are not resolved at the receiver, leading to SDUs being dropped. The preemption system 500 solves this problem by explicitly identifying each fragment of each SDU, allowing each SDU to be transmitted on a separate channel, and buffering each SDU fragment in a separate buffer at the receiver 30, with the different buffers being indexed by the channel ID field. So, in the example of FIG. 5, where the channel ID field indicates channel 0, the channel 0 buffer 42A used to store SDU1 fragments; where the channel ID field indicates channel 1, the channel 1 buffer 42B is used to store SDU2 fragments. The fragments of the two distinct SDUs will not be mixed together in a single data structure.

Further, the other newly defined header field, the sequence ID 86, will explicitly identify each segment of each SDU. In this manner, the receiver 30 will not be confused if the fragment, c, of SDU1 follows fragment, b, of SDU2, which follows fragment c+1 of SDU1, for integers b and c.

Further, the discard timer 34 will track the fragments of an SDU during transmission. Whenever a fragment, c, of the SDU is received on the non-ARQ connection, the discard timer for this SDU is started. In some embodiments, if all the fragments of the SDU don't arrive before the expiry of the discard timer 34, then all the fragments of that SDU that were already received are discarded. Since there is no ARQ, the MAC layer will no longer retransmit this SDU. Instead, the retransmission will be left to higher layers (if such capability exists in the higher layers).

In some embodiments, the value of the discard timer 34 is set by taking different parameters into account, such as the maximum delay time for a PDU (before the receiver gives up on receiving the missing sequence numbers, or SNs) and/or reordering buffer limitations in the receiver (which may be declared by the advanced mobile station, and influence the advanced base station's behavior on the downlink).

FIGS. 6 and 7 are diagrams showing operations of the fragmentation state machine 100 and the defragmentation state machine 200, respectively, in some embodiments. These diagrams depict a sequence of actions for a specific example when two SDUs are sent concurrently on the same FID on different channels. In FIG. 6, the fragmentation state machine transmits a first SDU, SDU1 with a flow ID 72 of one on a first MAC channel (e.g., channel 0) (block 102). A second SDU, SDU2, also arrives with a flow ID 72 of one. The headers of both SDU1 and SDU2 are populated with the FID value by the fragmentation characterization portion 22 of the fragmentation state machine 100. This second SDU, SDU2, has a higher priority than SDU1 (block 104). The channel select mechanism 24 of the fragmentation state machine 100 assigns SDU2 to a second MAC channel (e.g., channel 1) (block 106). This enables SDU1 fragments to transmit on the first channel while, simultaneously, SDU2 fragments are transmitted on the second channel (block 108). At some point, the transmission of SDU2 fragments is complete (block 110) and the transmission of SDU1 fragments is complete (block 112). It is irrelevant which SDU is received first, but both SDUs are received entirely by the receiver 30.

FIG. 7 shows the operations of the defragmentation state machine 200 to process SDU1 and SDU2. The defragmentation state machine operations show two independent paths that may occur simultaneously or serially, one for processing SDU1 (block 202-214) and the other for processing SDU2 (block 222-234). The channel identifier 32 of the defragmentation state machine 200 first determines the channel from which each fragment is received (as indicated in the headers), allowing SDU fragments of each channel to be processed separately. The scenario of FIG. 7 is for just two SDUs being transmitted wirelessly over two different channels. However, FIG. 7 could further be split into four parallel paths for N=2, eight paths for N=3, and so on.

The SDU1 fragments transmitted over the first MAC channel are received and stored in the first buffer 42A, at which point the defragmentation state machine 200 sets a first discard timer 34A (block 202). While the discard timer 34A is not expired (block 204) and before all SDU1 fragments have been received (block 208), the defragmentation state machine 200 receives additional SDU1 fragments into the first buffer 42A (block 212). Control returns to block 204 such that, before each succeeding fragment of SDU1 is received, the discard timer 34A is checked (block 204) and whether all SDU1 segments have been received is checked (block 208). Recall that the fragmentation control bits 82, found in the FPEH 80 of data SDUs and in the FEH 90 of management SDUs, indicates the last fragment of the SDU (FIGS. 3 and 4). When the FC 82 field indicates 10b, the final SDU fragment has been received.

If, on the other hand, the discard timer expires before the last fragment is received, the defragmentation state machine 200 empties the first buffer 34A, thus discarding all the fragments of the SDU1 (block 206). Where the discard timer has not expired, if all SDU1 segments have been received, the receiver 30 is able to identify each fragment, even where the fragments were obtained out-of-order, and decode SDU1 (block 210). For either the case where the buffer 42A is emptied of all fragments (block 206) or SDU1 is successfully decoded (block 210), the discard timer 34A is reset (block 214). For SDU1, the operations of the defragmentation state machine 200 is thus complete.

The operations for receiving the fragments of SDU2 mirror those of SDU1. The SDU fragments are stored in the second buffer 42B and the second discard timer 34B is set (block 222), and further SDU2 fragments are received (block 232) if the discard timer has not expired (block 224) and the receiver has not received all fragments (block 228). These operations are repeated until either the discard timer expires (block 224), in which case the second buffer 42B is emptied (block 226), causing all received SDU2 fragments to be discarded. Where all fragments have been successfully received, the receiver 30 decodes SDU2 (block 230) and the discard timer 34B is reset (block 234).

In some embodiments, there exists a single fragmentation state machine 100 and a single defragmentation state machine 200 for each connection. Also, in some embodiments, the defragmentation state machine 200 drops all fragments associated with the same SDU if any of them is treated as a loss at the HARQ layer.

Figure 8:
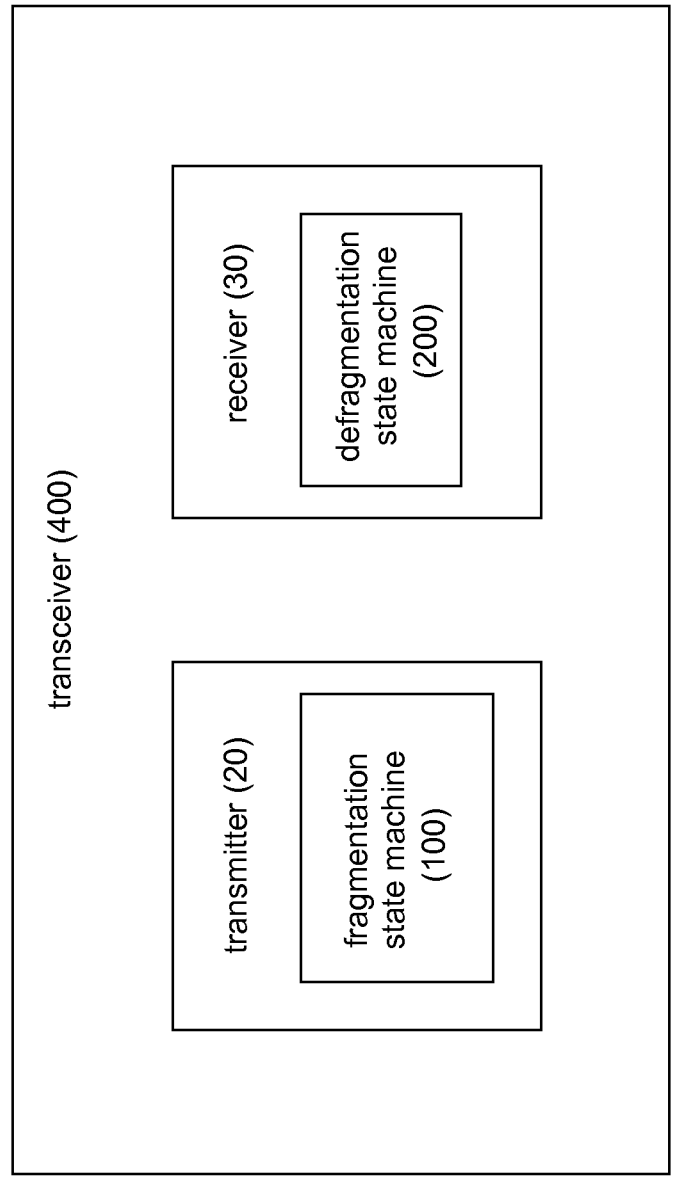
FIG. 8 is a block diagram of a transceiver system including the preemption system of FIG. 1, according to some embodiments.

The preemption system 500 of FIG. 1 may be found in a variety of different systems that are associated with WiMAX transmissions. For example, the preemption system 500 may be part of an advanced mobile station or an advanced base station supporting 802.16m. Both of these WiMAX entities are involved with both transmission and reception of packets; therefore, both entities need a transmitter and a receiver. FIG. 8 is a simplified block diagram of a transceiver 400 (transmitter and receiver), which includes the transmitter 20 with the fragmentation state machine 100 and the receiver 30 with the defragmentation state machine 200. Each state machine 100, 200 includes the features described above and illustrated in FIG. 1. With the fragmentation state machine 100, the transmitter 120 is able to explicitly characterize fragments before transmission and to separate fragments of different SDUs onto different transmission channels. With the defragmentation state machine 200, the receiver 130 is able to identify and buffer each fragment received based on its source channel and further process the fragments, despite their out-of-order transmission. Note that, in the transceiver 400, the transmitter 120 does not transmit to the receiver 130, but to a remote receiver (not shown) found on another device in the WiMAX network; likewise, the receiver 130 does not receive packets from the transmitter 120, but from a remote transmitter (not shown).

While the application has been described with respect to a limited number of embodiments, those skilled in the art will appreciate numerous modifications and variations therefrom. It is intended that the appended claims cover all such modifications and variations as fall within the true spirit and scope of the invention.

We claim:

1. A fragmentation state machine in a transmitter, the fragmentation state machine comprising:
a fragmentation characterization engine to:
generate a header for each fragment of a first service data unit (SDU), the first SDU comprising a plurality of fragments, the first SDU having a flow identifier (ID) indicating a first medium access channel (MAC)/flow connection, the header of each fragment comprising:
a first channel ID to indicate a first fragmentation channel through which the fragment of the first SDU is transmitted;
a sequence ID indicating a numerical location of the fragment in the first SDU; and
a fragmentation extension ID indicating whether the fragment is a first fragment, a last fragment, or a middle fragment of the first SDU, or whether the first SDU is unfragmented; and
generate a second header for each fragment of a second SDU, the second SDU comprising a plurality of fragments and the same flow ID as the first SDU, the second header of each fragment of the second SDU comprising:
a second channel ID to indicate a second fragmentation channel through which the fragment of the second SDU is transmitted;
a sequence ID indicating a relative numerical location of the fragment in the second SDU; and
a fragmentation extension ID indicating whether the fragment is a first fragment, a last fragment, or a middle fragment of the second SDU, or whether the second SDU is unfragmented;
wherein the fragments of the first and second SDUs are wirelessly transmitted on separate fragmentation channels of the same MAC/flow connection to a receiver.

2. The fragmentation state machine of claim 1, wherein transmission of the second SDU is initiated on the second fragmentation channel before transmission of the first SDU is completed on the first fragmentation channel.

3. The fragmentation state machine of claim 2, wherein the second SDU has a higher priority than the first SDU.

4. The fragmentation state machine of claim 1, wherein the flow ID is obtained from a field of a generic MAC header preceding each fragment.

5. The fragmentation state machine of claim 1, wherein the channel ID, the sequence ID, and the fragmentation extension ID are fields in a fragmentation and packing extension header preceding each fragment, the fragment comprising data.

6. The fragmentation state machine of claim 1, wherein the channel ID, the sequence ID, and the fragmentation extension ID are fields in a fragmentation extension header preceding each fragment, the fragment comprising management information.

7. A defragmentation state machine in a receiver, the defragmentation state machine comprising:
means to decode a header of each fragment of either a first service data unit (SDU) or a second SDU, wherein the first SDU is received wirelessly from a transmitter on a first fragmentation channel and the second SDU is received wirelessly from the transmitter on a second fragmentation channel, the first SDU comprising a flow ID and second SDUs comprising the same flow ID, each header comprising:
a channel ID, wherein the first SDU channel ID header indicates the first fragmentation channel and the second SDU channel ID header indicates the second fragmentation channel;
a sequence ID indicating a numerical location of the fragment in its respective SDU; and
a fragmentation extension ID indicating whether the fragment is a first fragment, a last fragment, or a middle fragment of the respective SDU, or whether the respective SDU is unfragmented;
a first buffer to receive fragments received on the first fragmentation channel;
a second buffer to receive fragments on the second fragmentation channel, wherein the channel ID operates as an index into the buffers of the receiver;
wherein the receiver, despite receiving the fragments of the first and second SDU out of order, is able to decode the first SDU and the second SDU using the header of each fragment.

8. The defragmentation state machine of claim 7, wherein the flow identifier indicates the MAC/flow connection through which the fragment is wirelessly received from the transmitter.

9. The defragmentation state machine of claim 8, further comprising:

a first discard timer to keep track of fragments stored in the first buffer, wherein all fragments of the first SDU are received before the first SDU is decoded; and a second discard timer to keep track of fragments stored in the second buffer, wherein all fragments of the second SDU are received before the second SDU is decoded.

10. The defragmentation state machine of claim 8, wherein the flow identifier is obtained from a field of a generic MAC header preceding each fragment.

11. The defragmentation state machine of claim 9, wherein the fragmentation extension ID, the channel ID, and the sequence ID are obtained from fields in a fragmentation and packing extension header preceding each fragment of a service data unit comprising data.

12. The defragmentation state machine of claim 9, wherein the fragmentation extension ID, the channel ID, and the sequence ID are obtained from fields in a fragmentation extension header preceding each fragment of a service data unit comprising management information.

13. The defragmentation state machine of claim 9, wherein the first buffer is emptied if the first discard timer expires before all fragments of the first service data unit are received from the transmitter.

14. The defragmentation state machine of claim 9, wherein the second buffer is emptied if the second discard timer expires before all fragments of the second service data unit are received from the transmitter.

15. The defragmentation state machine of claim 9, wherein the first discard timer has a value based on a maximum delay time for a protocol data unit.

16. A transceiver, comprising:
a transmitter comprising a fragmentation state machine, the fragmentation state machine to:
separately characterize each fragment of a service data unit (SDU) by adding a header to the fragment before transmission; and
send fragments of two distinct SDUs over different fragmentation channels to a remote receiver, wherein the two distinct SDUs share a flow identifier (ID); and a receiver comprising a defragmentation state machine, the defragmentation state machine to:
store each fragment received from a remote transmitter into one of a plurality of buffers, with the selected storage buffer being based on a channel ID of the fragment, until either all fragments of a service data unit associated with that fragmentation channel are received or a discard timer expires; and
for each buffer, identify the characterized fragments of the service data unit associated with the fragmentation channel and reorder them if needed.

17. The transceiver of claim 16, wherein the one or more headers comprise the following fields:
a flow identifier field to indicate the MAC/flow connection of the associated SDU;
a fragment control field to indicate whether the fragment is one of several fragments and, if so, whether the fragment is a first fragment, a last fragment, or a middle fragment;
a channel identifier field to specify the fragmentation channel through which the fragment is to be wirelessly transmitted to the remote receiver; and
a sequence identifier field to characterize the fragment as either a first fragment, a last fragment, or a middle fragment of the respective SDU, or whether the respective SDU is unfragmented.

18. The transceiver of claim 16, wherein the defragmentation state machine discards the contents of the buffer storing the fragments without decoding the respective SDU if the discard timer expires.

19. The transceiver of claim 17, wherein the flow identifier field is part of a generic MAC header and the fragment control field, the channel identifier field, and the sequence identifier field are part of a fragmentation and packing extension header of a data packet.

20. The transceiver of claim 17, wherein the flow identifier field is part of a generic MAC header and the fragment control field, the channel identifier field, and the sequence identifier field are part of a fragmentation extension header of a management packet.

* * * * *